United States Patent
Barone et al.

[15] 3,659,754
[45] May 2, 1972

[54] PELLETIZED ANIMAL FEED DISPENSER

[72] Inventors: Michael Barone, 10250 West 78th Avenue, Arvada, Colo. 80002; Frank Barone, Jr., 2561 South Wolff, Denver, Colo. 80219

[22] Filed: May 11, 1970

[21] Appl. No.: 36,337

[52] U.S. Cl. ..........................................222/368, 222/481
[51] Int. Cl. ..........................................................G01f 11/00
[58] Field of Search .................221/266; 222/368, 478, 353, 222/481, 444; 702/49; 198/62; 214/17

[56] References Cited

UNITED STATES PATENTS

| | | | |
|---|---|---|---|
| 2,837,228 | 6/1958 | Kaster | 214/83.72 X |
| 3,204,833 | 9/1965 | Weitzner | 222/368 X |
| 1,507,867 | 9/1924 | Stubbs | 222/368 |
| 910,246 | 1/1909 | Travis | 222/368 X |
| 1,488,228 | 3/1924 | Burns | 222/481 X |
| 950,286 | 2/1910 | Hauty | 222/368 X |
| 3,118,575 | 1/1964 | McCauley | 222/368 X |
| 2,898,011 | 3/1959 | Benton | 222/368 |

Primary Examiner—Robert B. Reeves
Assistant Examiner—Norman L. Stack, Jr.
Attorney—Anderson, Spangler & Wymore

[57] ABSTRACT

This invention relates to a dispenser for pelletized animal feeds characterized by an overhead open-topped feed storage hopper opening into a hollow cylindrical bucket mounted for rotation about a horizontal axis above a discharge chute. The bucket has an elongate inlet opening in the top thereof having an inclined trailing edge that cooperates with an adjacent edge of the hopper wall to produce a scissor-like shearing action adapted to easily cut through any pellets trapped therebetween. The lower edge of the opposite hopper wall bordering the bucket is foreshortened to provide a gap which is bridged by a brush wiper.

2 Claims, 4 Drawing Figures

Patented May 2, 1972

INVENTOR
MICHAEL BARONE
FRANK BARONE, JR.
BY
ATTORNEYS

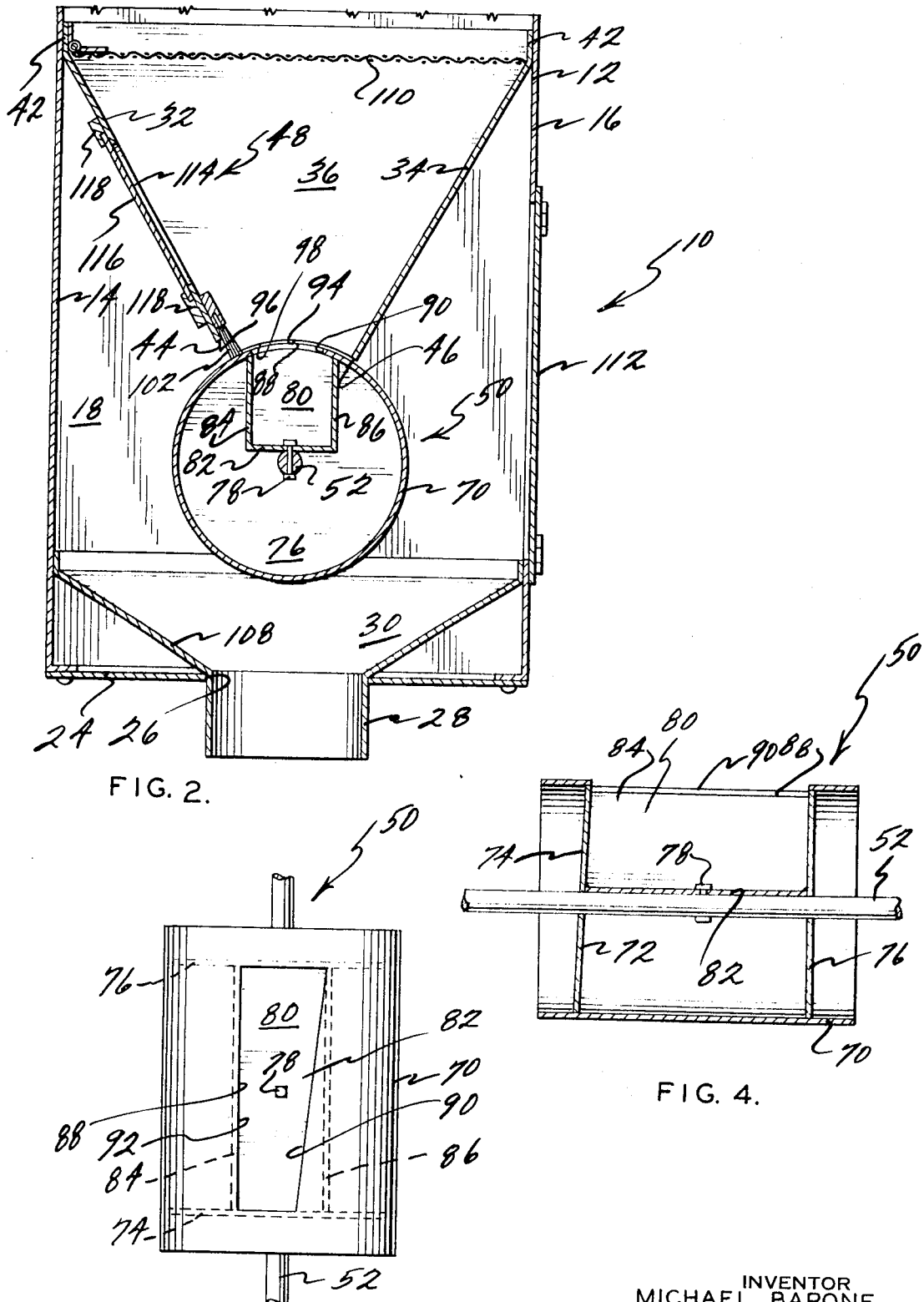
FIG. 2.
FIG. 3.
FIG. 4.
INVENTOR
MICHAEL BARONE
FRANK BARONE, JR.
BY
ATTORNEY

PELLETIZED ANIMAL FEED DISPENSER

Feeders for mechanically dispensing measured amounts of dry animal feed are known in the prior art and some have proven to be reasonably reliable while the majority of the others contain deficiencies that render them less than satisfactory, especially when automated. For instance, about the only automatic feeder that is consistently operational is the auger type that delivers the feed by means of a screw action and drops it through one or more discharge ports along the run. While mechanically reliable, even this kind of feeder has serious limitations that make it unsuitable for many animal feeding applications. For instance, it is almost impossible to control the quantity of feed discharged through each port where there are several and such a unit is absolutely incapable of delivering selected measured quantities at each station if such quantities differ materially.

Other mechanical feeders have employed solenoid-operated flap gates with adjustments to vary the stroke which, in turn, was intended to regulate the feed flow. Inordinately large and expensive solenoids were needed to answer the mechanical requirements and the cost became prohibitive. In addition, the units were quite noisy to the point of becoming intolerable to both man and animal.

Still other rotating bucket feeders proved unreliable and eventually inoperative due to the build-up of "fines" between the rotating element and stationary casing housing the latter. These powdered "fines" quickly compact into a solid coke that sooner or later jams the unit to the point where it no longer functions as intended.

The "gating" of the storage hopper is another problem that gave considerable trouble. When the leading edge of the gate moved across the closing edge of the hopper's discharge opening in parallel relation to the latter, enough pellets would often be trapped therebetween to jam the gate partly open.

These and other problems associated with the prior art mechanical feeders have, in large measure, been solved by means of the design innovations incorporated in the feeder forming the subject matter of the present invention. The design of the hopper itself is unique in that the edge thereof that closes off the inlet opening in the bucket lies in spaced relation to the latter and is provided with a brush wiper to bridge the gap therebetween. Thus, the trailing edge of the bucket inlet will cooperate with this brush to merely push most of the trapped pellets through the bristles thereof without appreciably impeding the rotation of the bucket. This brush also, of course, effectively seals the gap between the hopper wall and bucket so that the feed does not bypass the latter.

Some pelletized feeds vary considerably in length and some of the longer pellets will not pass freely through the gap between the bucket and brush-supporting wall of the hopper in certain positions. To obviate jamming when this occurs, the trailing edge of the bucket inlet is inclined relative to the closing edge of the hopper outlet so that the latter moves past the former with a scissor-like shearing action adapted to sever any long pellets thus wedged therebetween. By having the aforementioned edges arranged in an acute-angular relation to one another rather than a parallel one, they cooperate to shear any pellets trapped therebetween one-at-a-time with minimal extra power being required which, obviously, would not be the case if several pellets had to be cut all at once, a circumstance which has been found to occur rather frequently with parallel edges.

One wall of the hopper is provided with a door through which feed can be withdrawn manually bypassing the bucket. The hoppers of several feeders can be filled automatically, if desired, by means of a conveyor running across the open tops thereof.

The bucket, on the other hand, turns free of any stationary housing fitted closely therearound into which the "fines" would enter and become packed. The bucket, therefore, is virtually jam-proof as anything passing from the hopper onto the outside of the bucket passes freely on through and out the chute.

Conventional internal timing mechanisms and low r.p.m. gear motors can be used with the feeder forming the subject matter hereof to dispense the feed at selected times automatically. Obviously, with each feeder being susceptible of individual control, a series thereof can be fed by a common supply conveyor yet answer the varied feeding requirements of different animals in separate stalls.

As far as varying the quantity of feed dispensed at each feeding, this is done by varying the capacity of the bucket, preferably by making same with a predetermined maximum anticipated capacity and then reducing same through the use of removable plugs of some type.

Accordingly, it is the principal object of the present invention to provide a novel and improved mechanical dispenser for dry animal feed.

A second objective of the invention herein disclosed and claimed is the provision of a feeder having a rotating bucket that cooperates with the hopper delivering feed thereto so as to shear any pellets caught therebetween with a novel scissor-like action.

Another object is to provide a unit of the type aforementioned where the rotating bucket moves in spaced relation to the closing edge of the hopper wall and the gap thus defined is bridged by a brush wiper.

Still another objective is the provision of a pelletized animal feed dispenser in which feed can be taken from the hopper and discharged through the chute while bypassing the bucket.

An additional object is to provide a feeder which is susceptible of being completely automated so as to deliver measured amounts of feed at predetermined intervals variable according to need.

Further objects are to provide a pelletized animal feed dispenser that is rugged, reliable, virtually jam-proof, versatile, relatively inexpensive, simple, compact, easy to service and even somewhat decorative.

Other objects will be in part apparent and in part pointed out specifically hereinafter in connection with the description of the drawings that follows and in which:

FIG. 2 is a fragmentary section taken along line 2—2 of FIG. 1;

FIG. 3 is a fragmentary top plan view of the bucket; and,

FIG. 4 is a vertical diametrical section of the latter.

Figure 1:
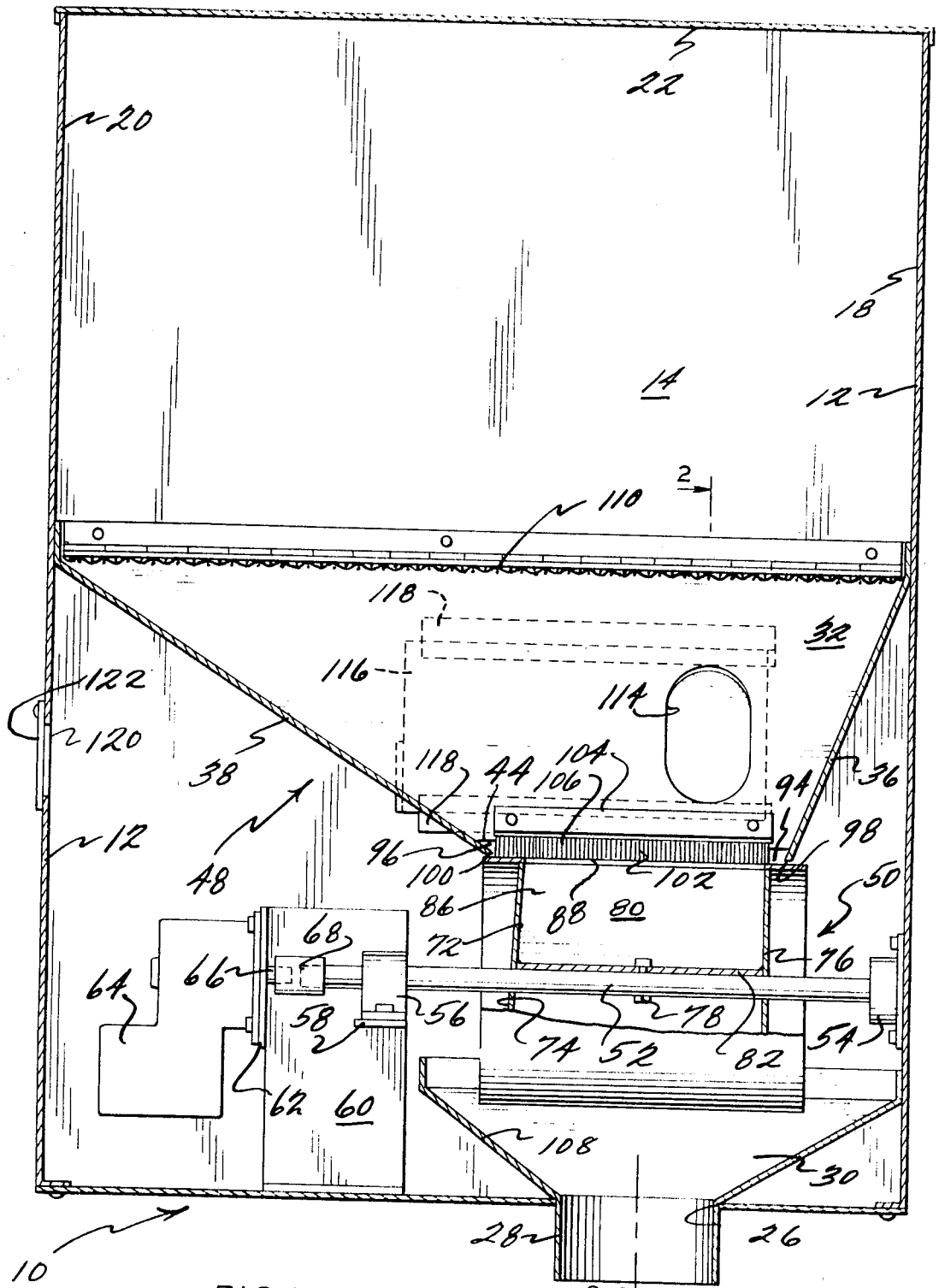
FIG. 1 is a side view, partly in elevation and partly broken away and shown in section.

Referring next to the drawings for a detailed description of the present invention and, initially, to FIGS. 1 and 2 for this purpose, reference numeral 10 has been selected to designate the feeder in its entirety and it will be seen to include a generally box-like outer housing 12 having right and left sidewalls 14 and 16, front and rear end walls 18 and 20, a top wall 22 in the form of a lid, and a bottom wall 24 with an opening 26 therein adapted to pass the nozzle 28 of discharge chute 30.

The upper portion of the housing is compartmentalized by sloping partition walls 32, 34, 36 and 38 to define a feed hopper generally designated by reference numeral 40. The aforementioned walls 32 and 34 comprise right and left downwardly and inwardly inclined sloping walls, the upper margins 42 of which are fastened to the sides of the housing while the lower edges 44 and 46 thereof lie in transversely spaced relation to one another as shown in FIG. 2 with wall 32 being the slightly shorter of the two. Walls 36 and 38 comprise the front and rear downwardly and inwardly inclined walls of the hopper and join with the sidewalls 32 and 34 just described to define an inverted hollow truncated pyramidal funnel generally indicated by reference numeral 48 at the bottom of the hopper 40. The funnel 48 discharges the feed in the hopper into a rotating bucket subassembly which has been broadly referred to by reference numeral 50 and which will now be described in detail.

Referring next to all of the figures of the drawing for a description of the bucket subassembly, it will be seen that a drive shaft 52 is journaled for rotation about a horizontal axis between a bearing 54 fastened to the front wall 18 and a pillow block 56 mounted atop platform 58 of upstanding mounting bracket 60 that rests on the bottom 24 of the housing. A vertically disposed flange 62 projecting to the left from the mounting bracket mounts a gear motor 64, the output shaft 66 of which is drivingly connected to shaft 52 by means of shaft coupling 68. This same bracket can, if desired, be used to support a conventional clock-timer by means of which the motor 64 is energized at preset intervals, a control circuit used to shut-off the motor upon completion of a single revolution or predetermined multiple thereof, overload mechanisms and the like, none of which have been illustrated as they all fall well within the skill of the average technician and, therefore, do not involve the exercise of invention. While on this subject, it should, perhaps, be pointed out that bucket 70 mounted on shaft 52 for rotation therewith is shown provided with its rear endplate 72 tilted slightly relative to the axis of rotation thus defining a cam surface 74 ordinarily used to actuate a microswitch (not shown) of the control mechanism aforementioned.

Bucket 70 is cylindrical and hollow with its ends closed by recessed endplates 72 and 76 through which the drive shaft 52 passes and is fastened thereto by a fastener 78 passing through the bottom 82 of feed-receiving compartment 80. Right and left compartment walls 84 and 86 cooperate with the bottom 82 and the bucket end walls 72 and 76 to define compartment 80. The bucket has a trapezoidal feed inlet opening 88 that is most clearly revealed in FIG. 3 opening into the top of the feed-receiving compartment. In this trapezoidal opening, the trailing edge 90 thereof, assuming counterclockwise rotation in FIG. 2, lies askew relative to the axis of bucket rotation while the leading edge 92 thereof lies in coplanar relation to the latter.

Now, the axis of rotation of the bucket 70 is located such that its exterior surface moves in fixed closely spaced relation to the lower edge 46 of left partition wall 34 of the hopper as shown in FIG. 2. Since the bucket rotates counterclockwise as seen in FIG. 2, edge 46 of the hopper will henceforth be referred to as the "opening edge" of the hopper discharge opening 94 while edge 44 will be designated the "closing edge" thereof. The radial distance between the axis of bucket rotation and the opening edge 46 of the hopper is just slightly greater than the radius of the bucket cylinder so that there is no rubbing frictional contact therebetween, yet, the gap is narrow enough to prevent the passage of any feed pellets therethrough. The closing edge 44 of the hopper opening, on the other hand, is spaced radially from the exterior surface of the bucket a sufficient distance to define a gap 96 therebetween of adequate width to easily pass the minimum dimension of any pellet in the hopper although, perhaps, not always the maximum dimension of the longer ones in a random distribution of pellets of various lengths. While closing edge 44 needn't necessarily lie a uniform distance away from the surface of the bucket, there is no particular advantage realized by doing it otherwise.

The lower edges 98 and 100 (FIGS. 2 and 3) of the front and rear partition walls 36 and 38 are, of course, curved to accommodate the cylindrical surface of the bucket 70 leaving much the same size of gap therebetween as between it and the opening edge 46 of the left partition wall 34. While bucket 70 completely blocks the discharge opening 44 in the hopper, the latter opening is larger than the inlet opening 88 into the feed-receiving compartment 82. Trailing edge 90 of the bucket inlet 88 is relative to the closing edge 94 of the right-hand hopper partition wall 32 so that it moves across the latter at an angle as the bucket rotates therepast. In so doing, any long pellets that happen to be caught in the gap 96 between the bucket and hopper will be cammed toward the upper right-hand corner of the bucket inlet opening 88 as viewed in FIG. 3 (front left-hand corner as seen from the front) where, if they have not been reoriented to the point where they will pass through said gap, they will be sheared off by the scissor-like action of trailing edge 90 moving obliquely past closing edge 44.

Again with specific reference to FIGS. 1 and 2, it will be seen that the gap 96 between the exterior surface of the bucket 70 and foreshortened closing edge 44 of the hopper wall 32 is bridged by a brush member 102, the spine 104 of which is fastened to the inside face of said partition wall by suitable fasteners. The bristles 106 of the brush sweep the surface of the bucket with a wiping action while preventing any pellets from gravitating through gap 96 into the chute 30 bypassing the bucket. On the other hand, the ends of any pellets within the compartment 82 that stick out the top thereof will easily pass through the bristles of the brush as the bucket turns.

As the bucket rotates in response to energization of gear motor 64, the feed compartment 82 empties into the funnel-shaped entry 108 of the discharge chute 30 that directs it to the nozzle 28 thereof and on out into the feed bin (not shown) of the animal stall.

Finally, with continued reference to FIGS. 1 and 2, a few additional features deserve specific mention. In the particular form illustrated herein, the top of the funnel portion 48 of the hopper is covered by a hinged lid 110 formed of heavy screen, the openings in which are preferably sized to pass the feed pellets while preventing the passage of larger foreign matter. A hinged door 112 is provided on the left sidewall of the housing to provide access to the working party for periodic maintenance and repair. Lastly, one of the partition walls 32 is preferably provided with an opening 114 covered by a sliding gate 116 mounted for transverse slidable movement between grooved tracks 118. Should it become necessary to supplement the regular feeding schedule, it is only necessary to open the gate and draw pellets directly from the hopper which will fall directly into the chute 30 bypassing the bucket 70. Access to the gate is provided through opening 120 in the rear wall which is ordinarily covered by pivoted plate 122 (FIG. 1). Ordinarily, the unit is mounted by fastening the right sidewall 14 of the housing to a vertical supporting surface thus leaving the front, rear and left side of the unit accessible.

What is claimed is:

1. The dispenser for pelletized animal feed and the like which comprises:
    a hollow cylindrical bucket having a feed-receiving opening in the cylindrical surface thereof mounted for axial rotation about a substantially horizontal axis;
    an open-topped feed storage hopper located above the bucket, said hopper having a funnel-shaped lower portion terminating in a discharge opening in the bottom thereof positioned to deliver feed into the feed-receiving opening in the bucket when the latter is in register therewith, the ends and opening edge of said discharge opening being spaced above the cylindrical surface of said bucket a distance such that a gap therebetween is produced sized to pass the major portion of the feed pellets within the hopper;
    a common housing encasing the hopper and bucket, said hopper including a second opening therein communicating with the interior of the housing but out of register with the intake opening in the bucket for bypassing feed around the latter, and an openable gate-forming means covering the second opening in the hopper providing access to the interior thereof;
    flexible wiper means attached to the closing edge of the hopper bridging the gap between the latter and the cylindrical surface of the bucket, said wiper being adapted to yield and permit a pellet projecting beyond the cylindrical surface of the bucket to pass therethrough upon rotation of the latter therepast; and,
    drive means connected to the bucket operative to rotate same.

2. The pelletized animal feed dispenser as set forth in claim 1 in which: the width of the gap is greater than the diameter of cylindrical pellets of uniform diameter within the hopper and narrower than the length of the longest pellets where the length thereof varies.

* * * * *